Patented Nov. 7, 1944

2,362,052

UNITED STATES PATENT OFFICE 2,362,052

DISTILLATION OF VOLATILE WATER-INSOLUBLE MATERIALS FROM AQUEOUS POLYMER DISPERSIONS

David Craig, Silver Lake, Ohio, assignor to The B. F. Goodrich Company, New York, N. Y., a corporation of New York No Drawing. Application September 23, 1943, Serial No. 503,536

10 Claims. (Cl. 202—46)

This invention relates to the removal and recovery by distillation of volatile materials from aqueous polymer dispersions and to a method whereby such distillations may be effected with improved efficiency and economy. More particularly the invention relates to a method of reducing or depressing the formation of foam during the removal by steam distillation of volatile steam-distillable substances from soap-containing aqueous polymer dispersions. Still more particularly, the invention is directed to a method of reducing foam formation during the steam distillation of monomeric styrene from synthetic rubber latices prepared by the incomplete polymerization of butadiene-1,3 and styrene in aqueous emulsion in the presence of soap.

In the production of synthetic rubber by the emulsion polymerization of mixtures of butadiene-1,3 and styrene, or of other mixtures of monomers comprising a butadiene-1,3 hydrocarbon and a monomer copolymerizable therewith in aqueous emulsion, the mixed monomers are emulsified in an aqueous solution of soap as an emulsifying agent; other materials including polymerization initiators and catalysts, which initiate and speed up the polymerization, and polymerization modifiers, which improve the plasticity and solubility of the product, are included in the emulsion and polymerization is then effected by agitating the emulsion at a temperature of 20 to 80° C. While the polymerization may be continued until substantially all of the monomers are converted into rubbery copolymers, it is ordinarily desirable, for a number of reasons, to terminate the polymerization after from 60 to 95% of the monomers have been converted into polymer. This prevention of further polymerization is accomplished, and at the same time oxidation and degradation of the copolymer produced is prevented, by adding a polymerization inhibitor or antioxidant such as a phenol or aromatic amine. It is then necessary to remove the unpolymerized monomers from the resulting synthetic rubber latex, in order both to recover the monomers and to produce the desired type of latex, before further processing of the latex into synthetic rubber. The unpolymerized butadiene-1,3, which is quite volatile, is easily removed simply by subjecting the latex to vacuum but the unpolymerized styrene, which is somewhat less volatile, is more difficult to remove and must ordinarily be steam-distilled from the latex.

In such steam distillation, however, numerous difficulties have arisen due to the fact that the presence of the soap renders the latex quite foamy. Thus, the formation of foam during steam distillation not only seriously impedes the distillation making the distillation a slow and laborious process but also frequently becomes so great that the capacity of the equipment used is exceeded resulting in loss of material and delay in carrying out the process. Moreover, the amount of foam produced has been found to vary considerably with the precise nature of the latex used being dependent among other things upon the nature and concentration of emulsifying agents, polymerization modifiers, polymerization inhibitors, and other substances used in the polymerization process, the degree to which the monomers have been converted into polymers and the particle size of the polymer in the latex. And, unfortunately, foaming is most pronounced when certain of the most effective polymerization procedures are used. Furthermore, the peculiar foaming encountered, being dependent upon such a wide variety of conditions, has been found generally not to be alleviated by conventional foam-breaking methods used in other more or less unrelated processes.

While it has been found that foaming during such distillation processes may be alleviated to a certain extent by the inclusion of salts of polyvalent metals such as calcium chloride in the dispersion, this expedient has not proved satisfactory because of the fact that the quantity of salt which must be added is sufficient to coagulate the dispersion unless added in an extremely dilute solution and, if so added, the volume of the dispersion is greatly and undesirably increased.

I have now discovered that foaming during distillation processes to remove monomeric material and other volatile substances from synthetic rubber latices and other soap-containing aqueous polymer dispersions, may be substantially reduced without either coagulating the dispersion or greatly increasing its volume, by the inclusion of both a water-soluble salt of a polyvalent metal and a complex alkali metal phosphate of the type hereinafter described, in the dispersion during the distillation. This combination of materials has been found to possess a profound foam-depressing action thereby permitting rapid and efficient distillation of volatile materials from the dispersion. In addition the complex alkali metal phosphate by sequestering the polyvalent metal ion or solubilizing the insoluble compounds produced, prevents coagulation of the dispersion, which would ordinarily occur due to the interaction of the polyvalent metal ions with the soap anions to form insoluble compounds.

The polyvalent metal salt employed may be any water-soluble salt of a polyvalent metal, the term "water-soluble" being used to denote the fact that an appreciable amount of the salt dissolves in water, say to an extent of at least 1 g., and preferably as much as 10 g., in 100 c. c. of water at 20° C. Typical examples of such water-soluble salts include the nitrates, chlorides, iodides, acetates and other water-soluble salts of such polyvalent metals as calcium, barium, strontium and magnesium (the group II-A metals), zinc, cadmium and mercury (the group II-B metals) aluminum, tin, lead, vanadium, chromium, manganese, iron, cobalt, nickel, bivalent copper and the like. The preferred salts are those in which the metal is bivalent, particularly the water-soluble salts of the group II metals.

The alkali metal phosphate used together with such a water-soluble polyvalent salt may in general be any alkali metal phosphate of the empirical formula

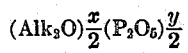

wherein Alk represents an alkali metal, $x$ and $y$ are small integers, generally from 1 to 10, and the ratio of $x$ to $y$ is not less than 1:1, preferably from 1:1 to 2:1. Included in this class of phosphates are the alkali metal metaphosphates, in which the ratio of $x$ to $y$ in the above formula is 1:1, such as sodium metaphosphate, sodium trimetaphosphate, potassium tetrametaphosphate, sodium hexametaphosphate and the like; the alkali metal polyphosphates including the tripolyphosphates, which possess the empirical formula $Alk_5P_3O_{10}$ (or in terms of the above formula,

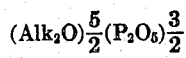

wherein the ratio of $x$ to $y$ (5 to 3) is 1.677 to 1.), the tetrapolyphosphates, which possess the empirical formula $Alk_6P_4O_{13}$ (or in terms of the above formula

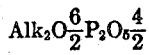

wherein the ratio of $x$ to $y$ (6 to 4) is 1.5 to 1), and other similar complex alkali metal phosphates. Mixtures of such phosphates which may also contain other phosphates such as pyrophosphates may also be employed. In general the preferred phosphates and phosphate mixes are those which, in the anhydrous state, are glass-like in character and which contain at least 50% $P_2O_5$, the glassy metaphosphates, especially the hexametaphosphates such as sodium hexametaphosphate (calgon), being particularly preferred.

The respective amounts of the water-soluble polyvalent metal salt and the alkali metal phosphate, i. e. the foam-depressant combinations of this invention, to be included in the aqueous polymer dispersion during its distillation to remove volatile materials therefrom, may be varied widely depending on the particular foam-depressant combination employed, the nature of the dispersion being treated and the degree to which foaming is to be depressed. However, since the presence of appreciable concentrations of polyvalent metal salts in the absence of phosphates results in coagulation of the dispersion and separation of aggregates of polymer, it is essential that the concentration of the phosphate be sufficient to prevent coagulation of the dispersion by the water-soluble polyvalent metal salt. In general amounts of less than about 1% of the salt based on the dry polymer content of the dispersion together with a slightly greater amount, but preferably less than 2% of the phosphate, do not produce coagulation and may be employed. In case the dispersion is a soap-containing synthetic rubber latex prepared by the incomplete emulsion polymerization of a mixture of butadiene-1,3 and styrene and it is desired to depress foaming during the steam distillation of monomeric styrene therefrom, it is preferred to employ about 0.02 to 0.1%, based on the polymer content of the latex, of a water-soluble salt of a group II metal such as calcium chloride, and from 0.1 to 0.5%, based on the polymer content of the latex, of an alkali metal hexametaphosphate such as calgon.

The inclusion of the foam depressant combination in the aqueous polymer dispersion is ordinarily most conveniently accomplished simply by adding, with stirring, an aqueous solution containing the desired amounts of the salt and the phosphate to the dispersion just prior to carrying out the distillation process. However, other methods and procedures for accomplishing the result may also be employed. For example, instead of adding the foam-depressants to the dispersion just prior to carrying out the distillation, they may be added during the distillation, as at the top of a distillation tower, or, in some instances, where the dispersion is prepared by emulsion polymerization, they may be present during the polymerization process thereby producing a less-foamy dispersion.

In the practice of the invention foaming is substantially reduced by the use of the foam-depressants described in any of the various distillation processes known to the art for removing volatile substances from soap-containing aqueous polymer dispersions. The distillation process may be a batch distillation process or a continuous distillation process carried out in a suitable column or tower such as a perforated-plate or bubble-cap column; it may be carried out at any suitable pressure and temperature; and a current of steam may or may not be employed. In the removal of monomeric styrene from synthetic rubber latices prepared by the incomplete emulsion polymerization of a mixture of butadiene-1,3 and styrene in the presence of a soap by steam distilling the styrene from the latex, the distillation is ordinarily accomplished by passing the latex downward through a stripping column equipped with bubble-cap or perforated plates, passing steam upward through the column and recovering a distillate comprising monomeric styrene and water at the top of the column. A particularly useful embodiment of the invention constitutes the use of the foam-depressants described in such a process.

In one such embodiment unpolymerized styrene was steam-distilled without encountering foaming difficulties from a particularly foamy synthetic rubber latex as follows:

A synthetic rubber latex is prepared by polymerizing a mixture of 75 parts of butadiene-1,3 and 25 parts of styrene in an aqueous emulsion containing, in addition to the monomers, 180 parts of water, 5 parts of fatty acid soap as an emulsifying agent, 0.3 part of potassium persulfate as a polymerization inhibitor and 0.6 part of a mixture of aliphatic mercaptans containing about 12 carbon atoms and consisting predominately of dodecyl mercaptan as a polymerization modifier, for 14 hours at a temperature of 50° C. and then adding, to stop the polymerization, 0.2 part of beta-naphthol, a polymerization inhibitor, dispersed in water. In this latex approximately 78% of the monomers are converted into the synthetic rubber copolymer while the remaining 22% of the monomers are in the monomeric or unpolymerized form. The latex is then subjected to a vacuum to flash out the unpolymerized butadiene-1,3 or, if desired, this step is carried out after addition of the foam-depressants as hereafter described in which case foaming during the removal of butadiene-1,3 is also substantially prevented. A dilute (approximately 2%) aqueous solution containing dissolved calcium chloride in an amount equal to 0.04% based on the content of polymer in the latex and dissolved sodium hexametaphosphate in an amount equal to 0.14% based on the content of polymer in the latex, is then added to the latex with efficient stirring without producing coagulation of the latex. A quantity of the thus obtained latex (still containing approximately 3% by volume of monomeric styrene) is then fed at the rate of about 1.5 gallons per minute to the top of an 18" diameter Lapp stripping column equipped with seven porcelain bubble-cap plates and further equipped for steam distillation with a 7½ ft. foam separator head, a condenser, condensate-separator and means for introducing steam at the bottom of the column in a ratio of about 5 parts of steam for 1 part of styrene in the latex. After equilibrium was established and while maintaining a latex feed of 1.4 to 1.6 gallons per minute, which is the capacity of the column, stripping of the styrene proceeded efficiently (97% of all styrene removed) and the height of foam in the foam-separator head did not rise above about 3½ ft.

When the distillation of a further quantity of the same latex except that it had not been treated with the solution of calcium chloride and sodium hexametaphosphate (the foam-depressants), is attempted in the same equipment it is found that the rate of latex feed has to be maintained at only about 0.3 gallon per minute in order to keep the height of foam to the permissible limit of 7½ ft.; thus showing that the presence of the foam-depressants enables the distillation to continue at over five times the rate possible in their absence.

Other similar embodiments wherein the styrene is distilled from similar synthetic rubber latices in the presence of these and other foam depressants of the type described also show that foaming is materially reduced by the presence of weak acids in the latex. For example, the stripping rate of a latex prepared as described above except that tri-isobutyl mercaptan was employed as the polymerization modifier was increased from about 0.3 gallon per minute to about 1.5 gallons per minute by the inclusion in the latex of 0.04 based on the polymer content of the latex, of calcium chloride or zinc chloride and .14%, based on the polymer content, of sodium hexametaphosphate. Similar results are also secured when the foam-depressants are added to the dispersion immediately after polymerization and prior to the removal of butadiene-1,3, and when they are present in the emulsion during the polymerization, the rate of polymerization being substantially unaffected, or in some cases actually improved, by their presence.

While the invention has been described with specific application to the steam-distillation of styrene from certain especially foamy butadiene-1,3 styrene synthetic rubber latices, it is to be understood that the invention is by no means so limited. Thus instead of the butadiene-1,3 styrene latices employed in the examples, the invention may be applied to the removal of styrene from other such latices prepared by emulsion polymerization using various other emulsifying agents and, if desired, in the presence of polymerization modifiers, polymerization initiators etc.; and, if desired, terminated by the addition of polymerization inhibitors or antioxidants. Emulsifying agents which may be used include, in addition to fatty acid soaps such as sodium oleate, sodium stearate, sodium myristate and the like, other soaps such as soaps of rosin acids or mixtures of any of these. Polymerization modifiers which may be used include aliphatic mercaptans of the type used in the specific examples such as "lorol" mercaptans, triisobutyl mercaptan, cetyl mercaptan, terpene mercaptans, kerosene mercaptans and other mercaptans of the formula R—SH where R is an aliphatic, heterocyclic, alicyclic or aromatic radical which may contain substituent groups such as halogen, carboxy, alkoxy, nitro, carbalkoxy, thioether and the like; and other sulfur-containing organic compounds such as the sulfides and polysulfides of such mercaptans, the xanthogens, thioxanthogens and dixanthogens, thiazyl disulfides, thiazoles and the like. Polymerization initiators which may be used include the per-compounds such as potassium persulfate, sodium perborate, benzoyl peroxide, hydrogen peroxide, diacyl peroxides and the like and any other of the well-known polymerization initiators. Polymerization inhibitors which are added to stop the polymerization and which also often serve as antioxidants or age-resistors for the synthetic rubber, include principally aromatic amines and phenols such as hydroquinone, catechol, p-amino phenol, beta-naphthol, diphenylamine, phenyl beta-naphthylamine, p-phenylenediamine and the like, and also other inhibitors such as tetramethyl thiuram monosulfide. Moreover, various other additions and procedures known to the art of emulsion polymerization may be employed and the latices so obtained used in the present invention.

Furthermore the invention may be applied to the distillation of various other monomers than styrene from various other synthetic rubber latices. For example, various synthetic rubber latices prepared by the emulsion polymerization of any butadiene-1,3 hydrocarbons such as butadiene-1,3, isoprene, 2,3-dimethyl butadiene-1,3, piperylene, methyl pentadiene or other open-chain conjugated dienes such as 2-chlorobutadiene-1,3,2-methoxy butadiene-1,3,2-cyano-butadiene-1,3 and the like either alone, in admixture with each other or with copolymerizable compounds such as styrene, acrylonitrile, methyl acrylate, methyl methacrylate, isobutylene, methyl vinyl ketone, methyl vinyl ether, vinylidene chloride, diethyl maleate and the like may be distilled either with steam or by vacuum distillation to remove unpolymerized volatile monomers or other volatile substances which may be present or to concentrate the latex by distilling off part of the water, and the method of this invention applied thereto. Again other soap-containing aqueous-polymer dispersions such as dispersions of polymers or copolymers of vinyl and vinylidene compounds and other polymerizable materials, which may have been prepared by emulsion polymerization or by dispersing such a polymer in aqueous medium, may often contain volatile substances which it is desired to remove by a distillation process and, if so, the method of this invention may be applied thereto. In short the invention is broadly applicable to the removal of any volatile compound by distillation from any aqueous polymer dispersion.

Having disclosed the invention broadly it is not intended that the invention be limited except by the spirit and scope of the appended claims.

I claim:

1. In a process of removing volatile substances from a soap-containing aqueous polymer dispersion by distilling said substances from said dispersion, the method of reducing the formation of foam during the distillation which comprises including in said dispersion a water-soluble polyvalent metal salt and an alkali metal phosphate of the empirical formula $$(Alk_2O)\frac{x}{2}(P_2O_5)\frac{y}{2}$$

wherein Alk represents an alkali metal, $x$ and $y$ are small integers and the ratio of $x$ to $y$ is not less than 1:1, the concentration of the said alkali metal phosphate being sufficient to prevent coagulation of the said dispersion by the said water-soluble salt.

2. The method of claim 1 wherein the water-soluble polyvalent metal salt is a water-soluble salt of a group II metal.

3. In a process of steam-distilling volatile steam distillable substances from an aqueous polymer dispersion prepared by an emulsion polymerization in the presence of a soap, the method of reducing the formation of foam during the distillation which comprises including in said dispersion a water-soluble polyvalent metal salt and an alkali metal phosphate of the empirical formula $$(Alk_2O)\frac{x}{2}(P_2O_5)\frac{y}{2}$$

wherein Alk represents an alkali metal, $x$ and $y$ are small integers and the ratio of $x$ to $y$ is not less than 1:1, the concentration of the said alkali metal phosphate being sufficient to prevent coagulation of the said dispersion by the said water-soluble salt.

4. In a process of steam distilling an unpolymerized steam-distillable monomer from an aqueous polymer dispersion prepared by the incomplete polymerization of a monomeric material comprising said steam-distillable monomer in an aqueous emulsion in the presence of a soap, the method of reducing the formation of foam during the distillation which comprises including in said dispersion a water-soluble polyvalent metal salt and an alkali metal phosphate of the empirical formula $$(Alk_2O)\frac{x}{2}(P_2O_5)\frac{y}{2}$$

wherein Alk represents an alkali metal, $x$ and $y$ are small integers and the ratio of $x$ to $y$ is not less than 1:1, the concentration of the said alkali metal phosphate being sufficient to prevent coagulation of the said dispersion by the said water-soluble salt.

5. In a process of steam-distilling monomeric styrene from a synthetic rubber latex prepared by the incomplete polymerization of a mixture of butadiene-1,3 and styrene in an aqueous emulsion in the presence of a soap, the method of reducing the formation of foam during the distillation which comprises including in said dispersion a water-soluble polyvalent metal salt and an alkali metal phosphate of the empirical formula $$(Alk_2O)\frac{x}{2}(P_2O_5)\frac{y}{2}$$

wherein Alk represents an alkali metal, $x$ and $y$ are small integers and the ratio of $x$ to $y$ is not less than 1:1, the concentration of the said alkali metal phosphate being sufficient to prevent coagulation of the said dispersion by the said water-soluble salt.

6. The method of claim 5 wherein the water-soluble polyvalent metal salt is a salt of a bivalent metal.

7. The method of claim 5 wherein the alkali metal phosphate is an alkali metal metaphosphate.

8. The method of claim 5 wherein the water-soluble polyvalent metal salt is a water-soluble salt of a group II metal and the alkali metal phosphate is an alkali metal hexametaphosphate.

9. The method of claim 5 wherein the water-soluble polyvalent metal salt is a water-soluble calcium salt and the alkali metal phosphate is sodium hexametaphosphate.

10. The method of recovering monomeric styrene from a synthetic rubber latex prepared by polymerizing a mixture of butadiene-1,3 and styrene in an aqueous emulsion in the presence of a fatty acid soap and a polymerization modifier until from 60 to 95% of the monomers are converted into polymer and then adding a polymerization inhibitor, which comprises adding to the latex a water-soluble polyvalent metal salt and a glassy alkali metal phosphate containing at least 50% $P_2O_5$, the concentration of the said alkali metal phosphate being sufficient to prevent coagulation of the latex by the said water-soluble salt, passing the latex downward through a stripping column, passing steam upward through the column and recovering a distillate comprising monomeric styrene and water at the top of the column, the said method being characterized by reduced foam formation in the column during the distillation.

DAVID CRAIG.